Dec. 18, 1962 JEAN-PAUL BERNARD 3,069,118
MEANS FOR ARRESTING OR STOPPING A LANDING
AIRCRAFT SUCH AS COMPOUND NET BARRIERS
Filed May 24, 1960 2 Sheets-Sheet 1
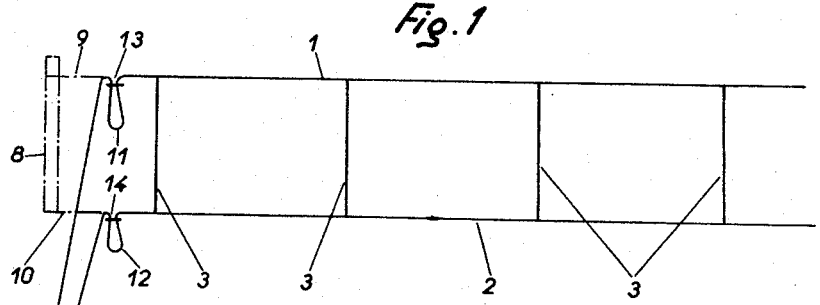
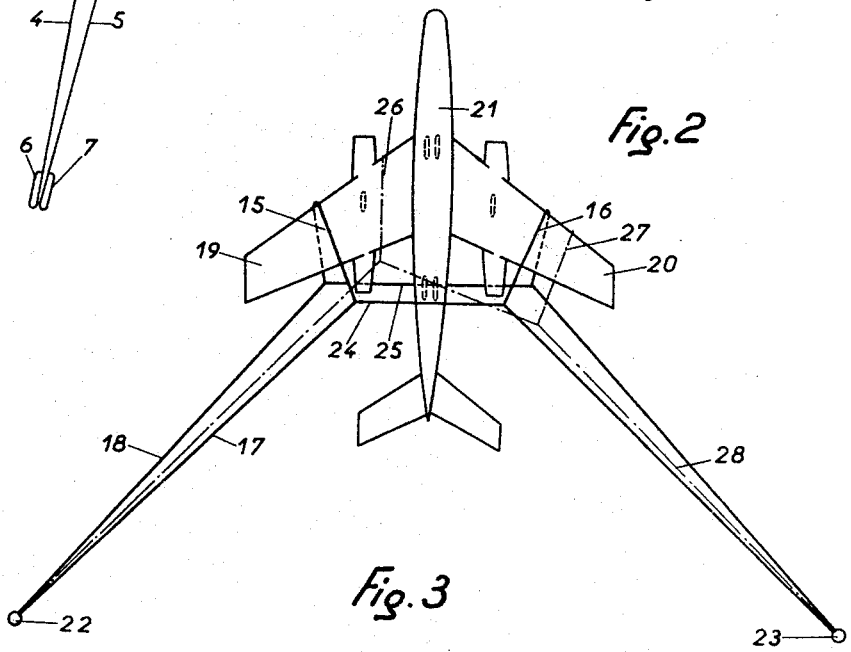
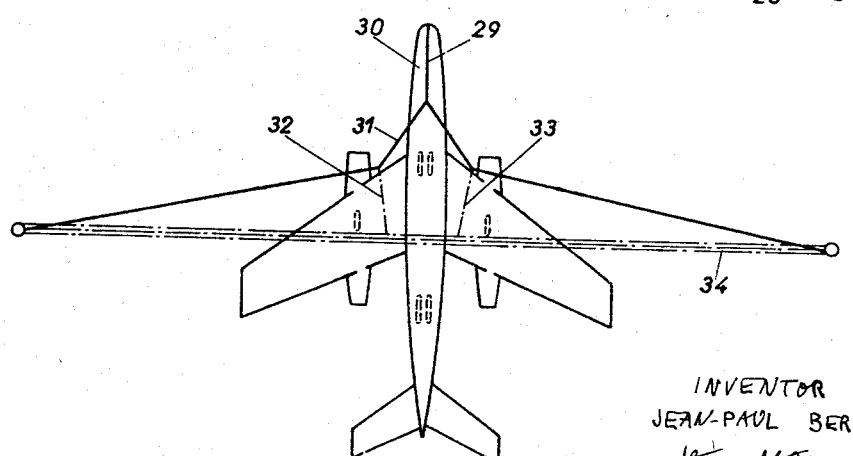
INVENTOR
JEAN-PAUL BERNARD
BY
AGENT

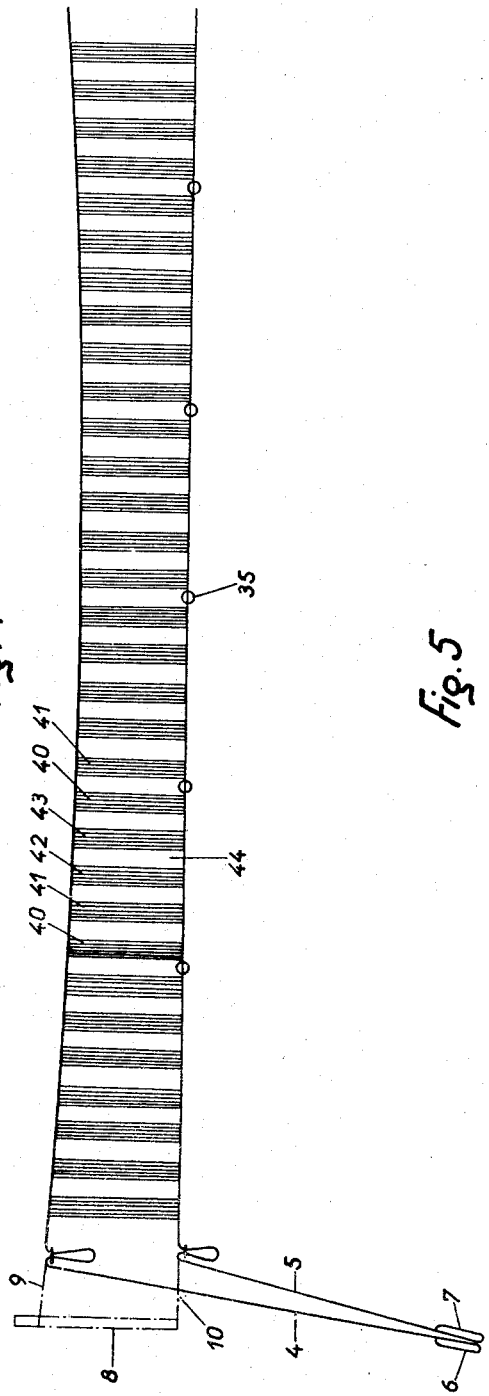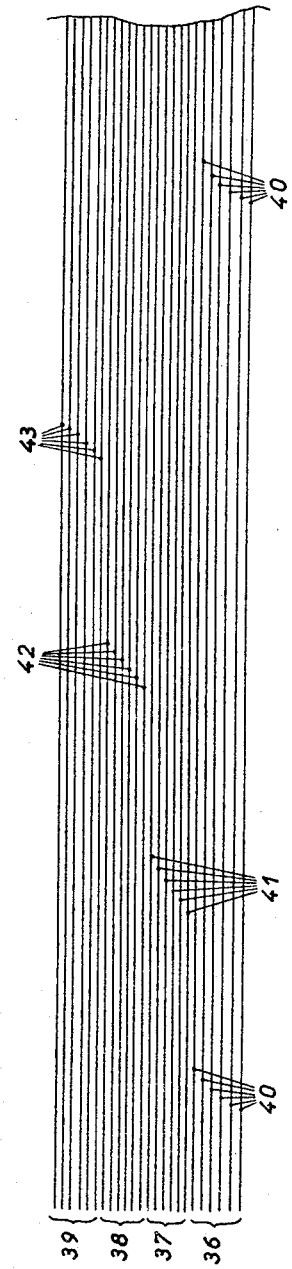

United States Patent Office 3,069,118
Patented Dec. 18, 1962

3,069,118
MEANS FOR ARRESTING OR STOPPING A LANDING AIRCRAFT SUCH AS COMPOUND NET BARRIERS
Jean-Paul Bernard, Paris, France, assignor to Aerazur Constructions Aeronautiques S.A., Issy-les-Moulineaux, France, a company of France
Filed May 24, 1960, Ser. No. 31,357
Claims priority, application France May 28, 1959
6 Claims. (Cl. 244—110)

The present invention relates to means for arresting or stopping a landing aircraft on a runway and more particularly to compound net barriers.

In compound net barriers of the prior art certain parts of the net may assume an undesirable position on the aircraft so as to damage the aircraft, and the known compound net barriers lack the versatility to meet the various operating conditions which may occur in practice.

The invention has therefore for one of its objects to provide a compound landing barrier which is suitable for aircraft, whatever their shape or geometry may be, and which does not damage the arrested aircraft whatever may be the point on which the barrier is struck by the aircraft. The barrier of the invention is easily installed on landing strips or runways of widely varying widths.

It is another object of the present invention to provide a construction of an arresting barrier such that no precise adjustments of brakes provided on each side of the runway are necessary.

In one of its aspects, the arresting barrier of the invention consists of a plurality of barrier elements. Each barrier element includes two vertically spaced horizontally elongated ropes or the like, and a plurality of horizontally spaced vertically elongated ropes. The two end portions of each vertical rope are respectively fastened to one of the horizontal ropes. All ropes normally extend substantially in a common plane and define therebetween at least one opening of a size sufficient to permit passage in a direction perpendicular to the plane of a portion of the fuselage of an aircraft to be arrested, while preventing passage of the wings of the craft. The horizontal spacing of corresponding vertical ropes in each barrier element is substantially the same, and the several barrier elements are juxtaposed in substantially parallel planes in such a manner that the corresponding vertical ropes of respective barrier elements constitute clusters. The ropes of each cluster are offset from each other in a horizontal direction transverse to the direction of movement of the aircraft arrested. The offset spacing between the vertical ropes of each cluster is very much smaller than the spacing of each cluster from an adjacent cluster. Fastening means are provided to fasten the barrier elements to the runway.

Such a compound net barrier is effective for a large number of types of aircraft.

In one of its more specific aspects, the invention provides a compound net barrier including a series of elementary barriers supported by a pair of poles on each side of the runway, said elementary barriers comprising each a pair of horizontal spaced ropes, strings, or bands extending across the runway. These horizontal elements are more or less tensioned, and similar vertical elements, are supported by said spaced horizontal elements, the distances between consecutive groups of vertical elements being such that said elementary barrier may act as a double harness adapted to engage the landing aircraft, one vertical element on each side of the longitudinal axis of said aircraft, thus avoiding a sliding movement of one harness over a V-shaped wing.

Another feature of the present invention resides in an arresting barrier for aircraft comprising a series of elementary barriers as stated above, said elementary barriers being placed close to one another so as to constitute an arresting compound barrier comprising a series of clusters of closely spaced vertical elements (at a few centimetres), said clusters of vertical elements being placed at a distance from one another of about a few metres.

These and other objects, features and advantages of the present invention will be disclosed more fully in the following specification based on the accompanying drawings in which:

FIG. 1 represents a partial front-elevational view of an elementary barrier to be used to constitute a compound barrier;

FIG. 2 represents a plan view used to explain the action of an elementary barrier struck by the wings of an aircraft;

FIG. 3 represents a plan view used in explaining the action of a barrier, one elementary barrier of which is shown as struck by the nose of the fuselage of an aircraft;

FIG. 4 represents schematically a side portion of a barrier incorporating features of the present invention, the view being in front elevation;

FIG. 5 illustrates the barrier of FIG. 4 in a fragmentary plan view on an enlarged scale showing a suitable distribution of the vertical elements of successive elementary barriers.

Each elementary barrier comprises an upper horizontal element or rope 1, a lower horizontal element or rope 2, and vertical elements or ropes 3, having a length of say several metres, and uniting together the horizontal elements or ropes 1—2, the terminal portions of which 4—5 are connected in 6—7 to brakes placed on each side of the runway. These horizontal elements or ropes are also connected on each side of the runway to a pole or post 8 by breakable connections 9—10. Finally, there may be provided loops 11—12 held by breakable links 13—14 which connect the terminal portions 4, 5 to the barrier element proper and secure the shape of the loops 11, 12. Breaking of the links 13, 14 causes looseness in the horizontal elements or ropes for a purpose which will be described later. The respective strengths of the vertical ropes and of the horizontal ropes are substantially of the same order of magnitude.

To explain the operation and advantages of the compound barrier according to the present invention, reference will be made to FIGURES 2 and 3.

In FIG. 2, it has been assumed that an aircraft has struck two consecutive vertical ropes 15—16 of an elementary barrier. The upper horizontal rope 1 is indicated at 17, and the lower horizontal rope at 18. The ropes 15 and 16 are struck by the two wings 19—20 of the aircraft, the nose of which 21 has been engaged midway between the horizontal ropes 17—18 and between the two ropes 15—16. This condition is the most favourable since the aircraft is braked symmetrically by the elementary barrier considered, the extremities of which are connected to the brakes 22—23. It is seen that the vertical ropes 15—16 each form a V the apex of which is directed forward, and the corresponding branches of the V are connected each by the parts 24 and 25 of the horizontal rope 17—18 which prevent them from sliding over the wings of the aircraft, even in the case of arrow-shaped wings. The V shape assumed by the vertical ropes 15—16 causes the lower horizontal rope 18 to be raised. If one of the horizontal ropes 17—18 is broken in the portion 24—25 by a protruding portion of the aircraft, the harness constituted by the vertical ropes 15—16 and the horizontal rope not broken will still fulfill its braking function. The spacing between the vertical ropes is such that if a rope is struck by one wing of the aircraft, the immediately following rope will be struck by the other wing. The most favourable distance depends upon the size of the aircraft, but a wide range of aircraft sizes may be accommodated by the same spacing.

In FIG. 2, another elementary barrier is shown in chain dotted lines, in the position assumed when struck by the two wings of an aircraft in an unsymmetrical fashion. The two vertical ropes struck are indicated at 26—27, and the horizontal ropes are indicated by the same line 28 in order not to crowd the drawing. If, according to a feature of the present invention, use is made of a plurality of elementary barriers with vertical ropes suitably spaced from one another, it is seen that a third elementary barrier is struck by parts of the wings which are symmetrical, with respect to a vertical median plane of the aircraft.

The distribution of the vertical ropes in the various elementary barriers constituting a compound barrier according to the invention provides large free spaces without any vertical ropes. The protruding parts of the aircraft are most likely to penetrate into those free spaces (see the nose of the fuselage of the aircraft in FIG. 2). Under favorable conditions, the fuselage of the aircraft and the engine penetrate into the free space between groups of vertical ropes of the successive elementary barriers and these protruding parts of the aircraft do not cause a lifting of the lower horizontal part of the barrier. This lower part remains on the ground and is passed over by the landing gear. The landing gear, after having passed over all the lower horizontal ropes, brings the wings into a position to strike a vertical rope and to lift the lower horizontal rope without risk of damage to the front part of the landing gear.

FIG. 3 represents an elementary barrier the vertical ropes of which are shown in the position assumed when struck by the nose 30 of an aircraft, thus lifting the lower horizontal rope of the barrier which may be struck by the front part of the landing gear. If this were the case for all the horizontal ropes or for a single highly resistant rope, the aircraft would be arrested by action on its landing gear instead of being arrested by action on its wings, and there would be a high probability of the aircraft being seriously damaged.

The present invention avoids this risk by dividing the compound barrier into independent elementary barriers each comprising an individual lower rope; whatever may be the condition of attack of the barrier by an aircraft, most of the elementary barriers will function properly.

However, it is important that the elementary barriers which are struck first during a landing should not immediately impinge upon the barriers located next in the direction of aircraft movement. For this reason the vertical ropes should be of sufficient length and the horizontal ropes may be loose. An aircraft which has struck its nose on an elementary barrier or a group of barriers may drive this elementary barrier or this group of elementary barriers over a substantial distance before the driving force be transmitted to the next el..mentary barrier or barriers which will therefore be passed over by the landing gear without damage.

In FIG. 3, there is shown how the looseness of a horizontal rope 31 supplements the looseness of a vertical rope 29 and of vertical ropes 32–33 connected by the horizontal rope 31, but belonging to other elementary barriers not initially struck by the aircraft so that the horizontal ropes 34 of these other barriers remain in a normal position without being carried forward before having been passed over by the landing gear.

According to an advantageous supplementary feature of the invention, the lower horizontal ropes are fixed to the ground by means of spaced breakable connectors 35 (see FIG. 4). The length of the vertical ropes should not be increased to the point of permitting the horizontal ropes to reach the portion of the plane where the rudder and elevator members are located. FIG. 3 is given by way of explanation, and the invention is not limited to the length of the vertical rope permitting the arrangement and operation of the arresting net illustrated in this figure.

FIGS. 4 and 5 show an advantageous distribution of the displacement between vertical ropes of successive barrier elements. FIG. 4 shows all the operating elements of only one of several juxtaposed barrier elements which constitute four groups. The other elements are represented merely by a showing of the vertically elongated rope elements. Each of the barrier elements will therefore be understood to include two vertically spaced horizontal pliable ropes attached to posts 8 by breakable connections 9, 10. The integral longitudinal end portions 4, 5 of these ropes which extend laterally beyond the connecting vertical ropes of the corresponding barrier element proper are thus integrally fastened to the barrier element, and a terminal portion of each rope portion 4, 5 is fastened to the runway by brakes 6, 7 in the usual manner. A central element of each rope end 4, 5 constitutes a loop 12 and two ends of which are connected by a breakable link, as described above with respect to FIG. 1. Each link secures the shape of the associated loop. The four barrier elements of each group share a pair of posts 8 and two brakes 6, 7.

As shown in FIGURES 4 and 5 the barrier is composed of 24 identical elementary barriers juxtaposed in respective parallel planes. The elementary barriers constitute 4 successive groups 36, 37, 38, 39, each composed of six elementary barriers the vertical ropes of which form clusters 40, 41, 42, 43. The individual vertical ropes in each cluster are spaced or offset horizontally from one another only by a few centimetres whereas a large free space 44 is provided between the vertical ropes of two successive clusters. As is evident from FIG. 5, the spacing of the several elementary barriers longitudinally of the runway is of the same order of magnitude as the horizontal spacing of vertical ropes in each cluster.

The various ropes of the elementary barriers may be either metallic cables or textile cables. The ropes should have a high elongation coefficient such as is available in certain synthetic textile materials.

In a particular instance, a compound barrier giving excellent results was constituted by 28 elementary barriers divided into four groups of seven elementary barriers each; the distance between each group of vertical ropes was about one metre and twenty-five centimetres, and each vertical rope within a group of vertical ropes was about 8 centimetres from the adjacent vertical ropes. Such a compound barrier gave excellent braking action for aircraft of a width of about 10 to 12 metres. The brakes provided on each side of the runway or landing strip were adjusted to provide a braking action of about three tons plus or minus half a ton, but even one ton may be sufficient.

It will be understood that the examples particularly described above are not intended to limit this invention. Various modifications of and additions to the arrangements described are possible without exceeding the scope of the invention. In particular, the number of elementary barriers and the distribution of their vertical ropes could be changed without departing from the spirit of the invention defined in the appended claims.

What I claim is:

1. An arresting barrier for arresting aircraft having a fuselage and wings of predetermined size, comprising a plurality of barrier elements, each including two vertically spaced horizontally elongated rope members, and a plurality of horizontally spaced vertically elongated rope members each having two end portions respectively fastened to said vertically spaced rope members, said rope members normally extending substantially in a common plane and defining therebetween at least one opening of a size sufficient to permit passage of a portion of the fuselage of an aircraft to be arrested in a direction substantially perpendicular to said plane while preventing passage of the wings of said aircraft, the horizontal spacing of corresponding vertically extending rope members in each barrier element being substantially the same, said barrier elements being juxtaposed in substantially parallel planes, corresponding vertically extending rope members of respective barrier elements constituting clusters, the rope members of each cluster being offset relative to the other members of said cluster horizontally and laterally of said direction, the offset spacing between the vertically extending rope members of each cluster being smaller than the spacing of each cluster from an adjacent cluster; and fastening means for fastening said barrier elements to a runway.

2. An arresting barrier as set forth in claim 1, wherein said plurality of barrier elements constitutes a first group of barrier elements, said barrier further comprising a second group of barrier elements substantially identical with said first group, the barrier elements of said first and second groups being juxtaposed in substantially parallel planes, and the clusters of said second group being horizontally and laterally spaced from the clusters of said first group with respect to said direction, the latter spacing being substantially greater than the offset spacing of the rope members in each of said clusters.

3. An arresting barrier as set forth in claim 1, wherein said fastening means includes an elongated pliable fastening member having a first terminal portion integrally connected to one of said barrier elements, a second terminal portion adapted to be secured to said runway, and a central loop-shaped portion, and breakable connecting means secured to said terminal portions for securing the loop shape of said central portion.

4. An arresting barrier as set forth in claim 1, wherein said fastening means includes a plurality of connector members for connecting spaced portions of a lower one of said horizontally elongated rope members to said runway.

5. An arresting barrier as set forth in claim 4, wherein said connector members are breakable.

6. An arresting barrier as set forth in claim 1, wherein the mechanical strength of said rope members is of the same order of magnitude.

References Cited in the file of this patent

UNITED STATES PATENTS

| 2,465,936 | Schultz | Mar. 29, 1949 |
| 2,675,197 | Hospers | Apr. 13, 1954 |
| 2,854,201 | Cotton | Sept. 30, 1958 |
| 2,872,136 | Cotton et al. | Feb. 3, 1959 |

FOREIGN PATENTS

| 617,498 | Great Britain | Feb. 7, 1949 |